United States Patent
Pathikonda et al.

(10) Patent No.: US 11,153,214 B2
(45) Date of Patent: Oct. 19, 2021

(54) IN SERVICE FLOW CAPABILITY UPDATE IN GUARANTEED BANDWIDTH MULTICAST NETWORK

(71) Applicant: Cisco Technology, Inc., San Jose, CA (US)

(72) Inventors: Padmanab Pathikonda, Mountain House, CA (US); Rishi Chhibber, Dublin, CA (US); Roshan Lal, San Jose, CA (US); Varun Manchanda, San Jose, CA (US); Francesco Meo, San Jose, CA (US); Vaibhav Dhage, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 16/389,197

(22) Filed: Apr. 19, 2019

(65) Prior Publication Data
US 2020/0336429 A1   Oct. 22, 2020

(51) Int. Cl.
| *H04L 12/801* | (2013.01) |
| *H04L 12/761* | (2013.01) |
| *H04L 12/927* | (2013.01) |
| *H04L 12/729* | (2013.01) |
| *H04L 12/923* | (2013.01) |
| *H04L 12/721* | (2013.01) |

(52) U.S. Cl.
CPC ............ *H04L 47/15* (2013.01); *H04L 45/125* (2013.01); *H04L 45/16* (2013.01); *H04L 45/36* (2013.01); *H04L 47/762* (2013.01); *H04L 47/806* (2013.01)

(58) Field of Classification Search
CPC ....... H04L 47/15; H04L 45/125; H04L 45/16; H04L 45/36; H04L 47/762; H04L 47/806; H04L 12/18; H04L 49/201
See application file for complete search history.

(56) References Cited

U.S. PATENT DOCUMENTS

| 8,004,890 B2 * | 8/2011 | Chang ..................... G11C 11/56 365/185.03 |
| 8,004,980 B2 * | 8/2011 | Ferguson ................ H04L 47/10 370/230 |
| 8,427,959 B2 * | 4/2013 | Alvarez .................. H04L 45/16 370/238 |

(Continued)

*Primary Examiner* — Ian N Moore
*Assistant Examiner* — Latresa A McCallum
(74) *Attorney, Agent, or Firm* — Merchant & Gould P.C.

(57) ABSTRACT

In service flow capability updating in a guaranteed bandwidth multicast network may be provided. First, a node may determine that a bandwidth requirement of a flow has changed to a new bandwidth value. Then, in response to determining that the bandwidth requirement of the flow has changed to the new bandwidth value, an ingress capacity value may be updated in an interface usage table for a Reverse Path Forwarding (RPF) interface corresponding to the flow. The RPF interface may be disposed on a network device. Next, in response to determining that the bandwidth requirement of the flow has changed to the new bandwidth value, an egress capacity value may be updated in the interface usage table for an Outgoing Interface (OIF) corresponding to the flow. The OIF may be disposed on the network device.

17 Claims, 7 Drawing Sheets

(56) References Cited

U.S. PATENT DOCUMENTS

| | | | |
|---|---|---|---|
| 2003/0165141 A1* | 9/2003 | Hagsand | H04J 3/085 370/395.21 |
| 2004/0156313 A1* | 8/2004 | Hofmeister | H04L 49/253 370/229 |
| 2006/0182118 A1* | 8/2006 | Lam | H04L 47/13 370/395.42 |
| 2012/0218898 A1* | 8/2012 | Cai | H04L 45/24 370/237 |
| 2014/0362705 A1* | 12/2014 | Pan | H04L 45/00 370/237 |
| 2016/0277463 A1* | 9/2016 | Nagarajan | H04L 12/18 |
| 2016/0315865 A1* | 10/2016 | Kalkunte | H04L 45/123 |

* cited by examiner

IN SERVICE FLOW CAPABILITY UPDATE IN GUARANTEED BANDWIDTH MULTICAST NETWORK

TECHNICAL FIELD

The present disclosure relates generally to in service flow capability updating.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
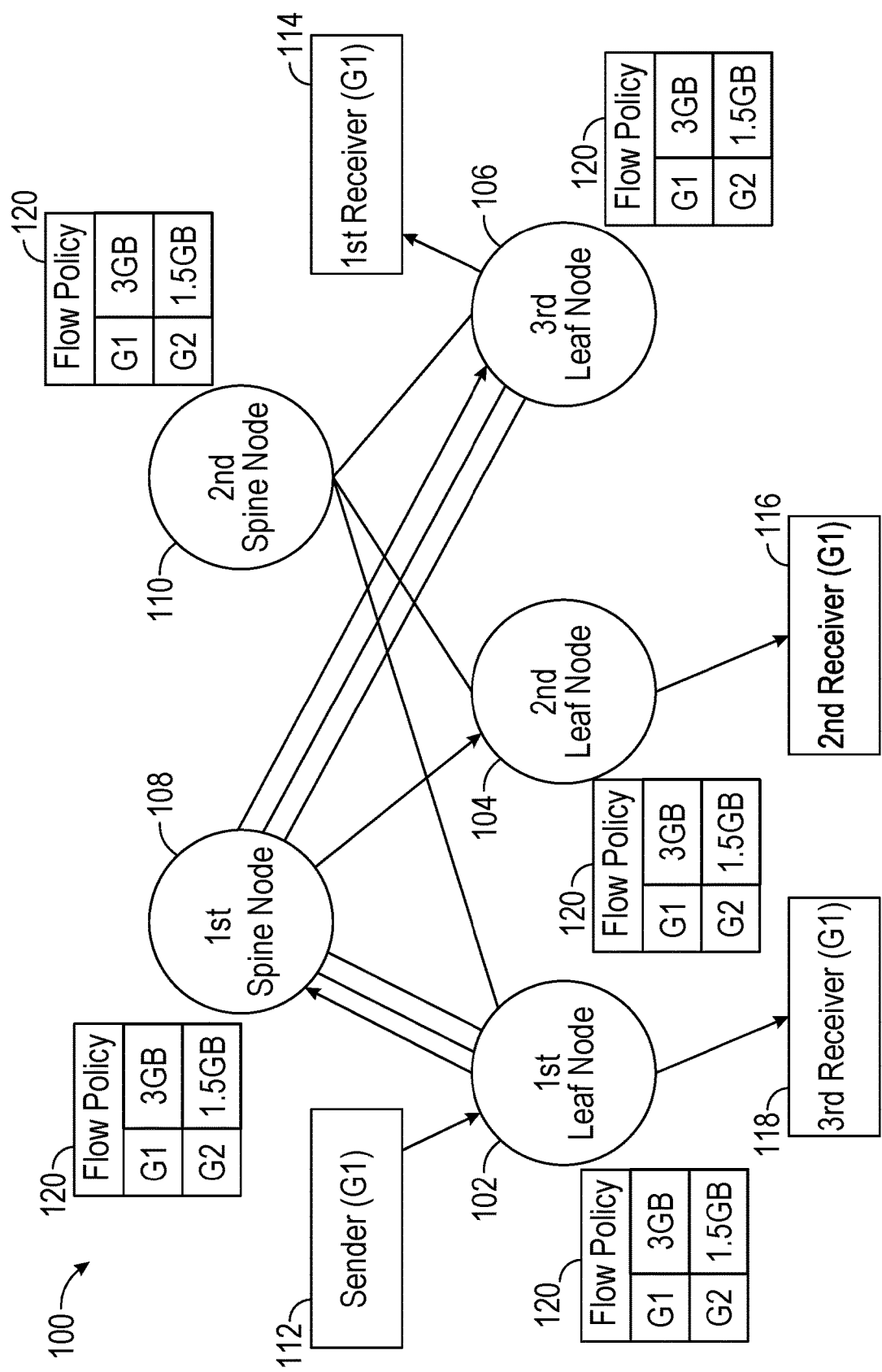
FIG. 1 shows a system for providing in service flow capability updating in a guaranteed bandwidth multicast network.

In service flow capability updating in a guaranteed bandwidth multicast network may be provided. First, a node may determine that a bandwidth requirement of a flow has changed to a new bandwidth value. Then, in response to determining that the bandwidth requirement of the flow has changed to the new bandwidth value, an ingress capacity value may be updated in an interface usage table for a Reverse Path Forwarding (RPF) interface corresponding to the flow. The RPF interface may be disposed on a network device. Next, in response to determining that the bandwidth requirement of the flow has changed to the new bandwidth value, an egress capacity value may be updated in the interface usage table for an Outgoing Interface (OIF) corresponding to the flow. The OIF may be disposed on the network device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

In a capability aware multicast solution (e.g., bandwidth aware multicast), a flow may be provisioned with a provided flow capability. For example, an administrator may configure bandwidth requirements for specific multicast groups, and then the flows may be stitched with guaranteed bandwidth. In other words, link selection for a Reverse Path Forwarding (RPF) interface and for an Outgoing Interface (OIF) may be done with bandwidth requirements in mind. Links may not be allowed to be over-provisioned. Furthermore, any network failures may also be corrected with the bandwidth guarantee in mind.

With conventional systems, the aforementioned flow bandwidth requirements are set at inception of a flow and are carried through the life of the flow. However, an end user may want to update the bandwidth requirements on the fly. With conventional systems, to change the bandwidth requirements (e.g., the flow capability), the impacted flows are stopped and then restarted. This is undesirable for various reasons. First, the conventional process makes it necessary for the user to be aware of all endpoints participating in a flow and be able to stop and start them on demand. This is not always possible or easy. In addition, just stopping an endpoint (e.g., stopping a source device) does not immediately remove a flow from a network. The network ages out the flow, which may add several minutes to the process. Furthermore, even if the aforementioned issues were overcome, the stopping and restarting the target flow introduces a time window where a new flow might come in and claim the bandwidth previously used by the target flow, and hence after the modification, the target flow may not be able to become established. Embodiments of the disclosure provide a process that may allow a network to accept and update the flow bandwidth for existing flows smoothly.

FIG. 1 shows a system for providing in service flow capability updating in a guaranteed bandwidth multicast network. As shown in FIG. 1, system 100 may comprise a plurality of network devices (i.e., nodes) comprising, for example, switches or routers. The plurality of network devices may comprise a first leaf node 102, a second leaf node 104, a third leaf node 106, a first spine node 108, and a second spine node 110. System 100 may comprise a plurality of links connecting the plurality of network devices.

System 100 may further comprise a sender 112, a first receiver 114, a second receiver 116, and a third receiver 118. Sender 112 may be the source of a guaranteed bandwidth multicast flow G1. First receiver 114, second receiver 116, and third receiver 118 may have joined and may be receiving multicast flow G1 from sender 112. Multicast flow G1 may be provisioned by stitching together links between the plurality of nodes in system 100. A flow policy table 120 may be stored on each of the plurality of nodes in system 100 indicating the bandwidth that has been guaranteed to certain flows on system 100. As shown in flow policy table 120 of FIG. 1, multicast flow G1 may have been guaranteed 3 GB of bandwidth for example.

The plurality of node in system 100 may comprise First Hop Routers (FHRs), Intermediate Hop Router (IHRs), and Last Hop Routers (LHRs). An FHR may comprise a node where a sender (i.e., a source) may be connected. An IHR may comprise any intermediate node on a flow path (e.g., a spine node). An LHR may comprise a node where receivers may be connected. Flows may ingress a node at a Reverse Path Forwarding (RPF) interface. Each flow has one such ingress interface per node. Flows may egress a node at an Outgoing Interface (OIF). Each flow may have several OIFs per node. As will be described in greater detail below, each RPF interface may comprise a policer that may limit the bandwidth of a flow at an RPF interface. Distributed nature of state machines (e.g., on each of the nodes (FHR, IHR, LHR)) decisions to add or delete OIF and RPF may be taken based on the bandwidth programmed on that node only for example.

Elements of system 100 (i.e., first leaf node 102, second leaf node 104, third leaf node 106, first spine node 108, second spine node 110, sender 112, first receiver 114, second receiver 116, third receiver 118, and the policer) may be practiced in hardware and/or in software (including firmware, resident software, micro-code, etc.) or in any other circuits or systems. Elements of system 100 may be practiced in electrical circuits comprising discrete electronic elements, packaged or integrated electronic chips containing logic gates, a circuit utilizing a microprocessor, or on a single chip containing electronic elements or microprocessors. Elements of system 100 may also be practiced using other technologies capable of performing logical operations such as, for example, AND, OR, and NOT, including but not limited to, mechanical, optical, fluidic, and quantum technologies. As described in greater detail below with respect to FIG. 6, elements of system 100 may be practiced in a computing device 600.

Embodiments of the disclosure may provide a system administrator a capability to provision flow policies for multicast groups. A flow policy associates an administratively defined capability, like required bandwidth, with a set of multicast groups (e.g., G1, G2, etc.). Each node in system 100 may discover and may maintain a list of interfaces with their total capacity, and available capacity in an interface usage table. Table 1 below shows an example interface usage table.

TABLE 1

| Interface | Total Capacity | Ingress Capacity in Use | Egress Capacity in Use |
|---|---|---|---|
| Eth 1/4 | 40 G | 10 G | 12 G |
| Eth 1/3 | 40 G | 39 GB | 9 GB |
| Eth 1/14 | 40 G | 30 G | 0 G |
| ... | ... | ... | ... |

The flow capabilities may be configured in a flow policy table (e.g., flow policy table 120 of FIG. 1) on each of the plurality of nodes in system 100. An example flow policy table in shown in Table 2 below. Consistent with embodiments of the disclosure, a new flow on each node (e.g., FHR, IHR, LHR) may consult flow policy table 120 for a given multicast group and reserve bandwidth on the flow's RPF interface and also on each OIF of the flow. As the interfaces are selected, the interface usage table (e.g., Table 1) may be updated to reflect the accurate current usage.

TABLE 2

| Flow Policy | |
|---|---|
| Group | BW Required |
| 232.1.0.0/16 | 3 GBPS |
| 234.1.1.1/32 | 20 MBPS |
| 235.0.0.0/8 | 128 KBPS |
| ... | ... |

As stated above, a per-flow policer may be instantiated in each RPF interface (e.g., programmed at an ingress line-card ASIC), so that eventual excess traffic (i.e., traffic more than that of bandwidth dictated by flow policy table 120) received on the RPF interface may be dropped and hence avoid over-subscribing the links connected to downstream nodes.

Whenever an RPF interface for a flow is NULL (e.g., this could be due to insufficient bandwidth on the ingress interface or due to a dynamic flow policy change and if the new bandwidth is not able to be accommodated on the RPF interface), a device redirect packet may be sent to the downstream nodes (i.e., sent on all the OIF interfaces of the impacted flow) so that the flow may be migrated to a next possible upstream path.

With embodiments of the disclosure, when a new flow starts, it may either be accepted or rejected based upon a current bandwidth requirement of the flow verses a link availability/utilization. Consistent with embodiments of the disclosure, for any flow capability change on a node in system 100, the capability change may be updated quickly without impacting the active flows.

Once the bandwidth requirement of a flow has changed, each node in system 100 that is traversed by the flow may: i) update the RPF interface (i.e., the incoming interface of a flow) link bandwidth in the usage interface table to the latest value if the RPF interface can accommodate the latest bandwidth value; ii) update each of the OIF (i.e., outgoing interface of the flow) link bandwidths in the usage interface table to the latest value if the OIFs can accommodate the latest bandwidth value; and iii) update the policer at the RPF interface with new bandwidth information if the RPF interface can accommodate the latest bandwidth value. The bandwidth update may be of following types:

0 to X;

X to 0;

X to Y; where

X>Y, or

X<Y; or

X==Y (This may be a no-op, no operation required from the nodes).

These bandwidth update types are discussed in further detail below.

Figure 2A:
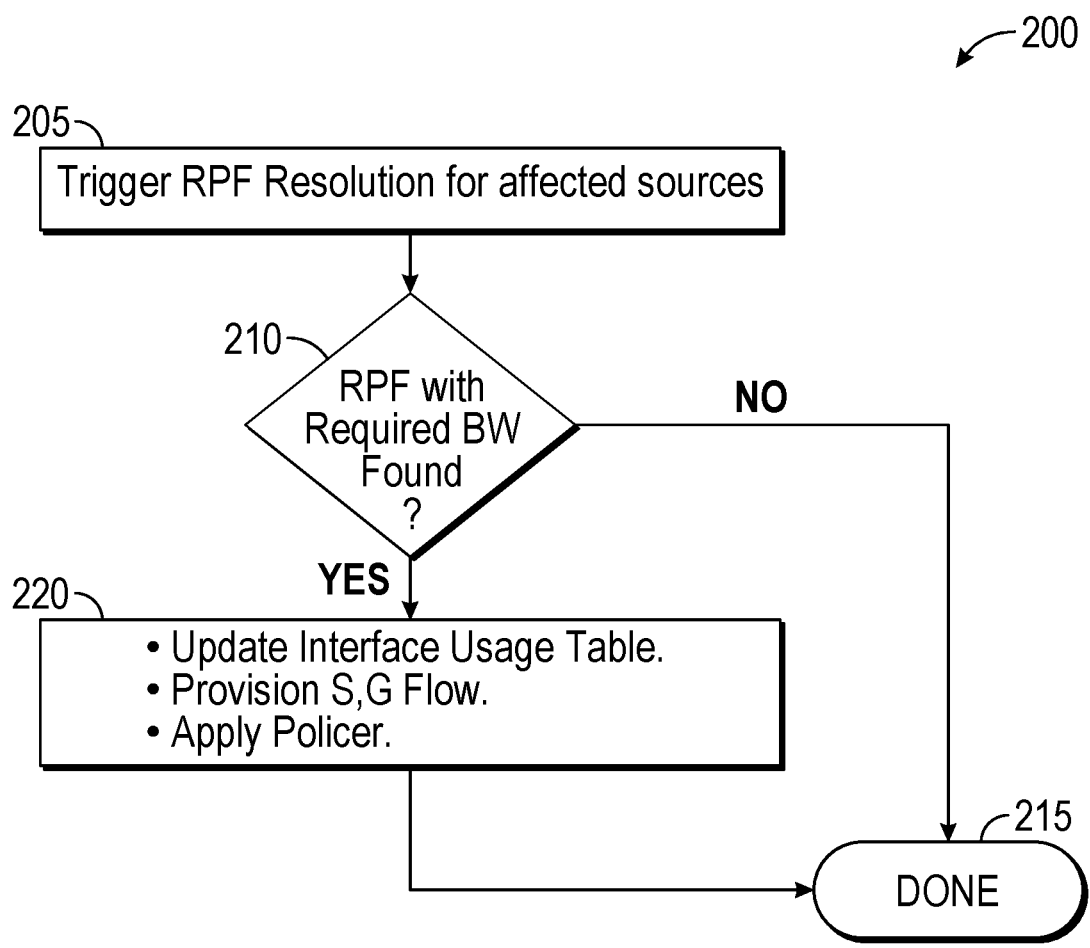
FIG. 2A and FIG. 2B are flow charts setting forth the general stages involved in methods for providing in service flow capability updating in a guaranteed bandwidth multicast network when the bandwidth requirement of a flow has changed from zero to a value greater than zero (i.e., X)
Figure 2B:
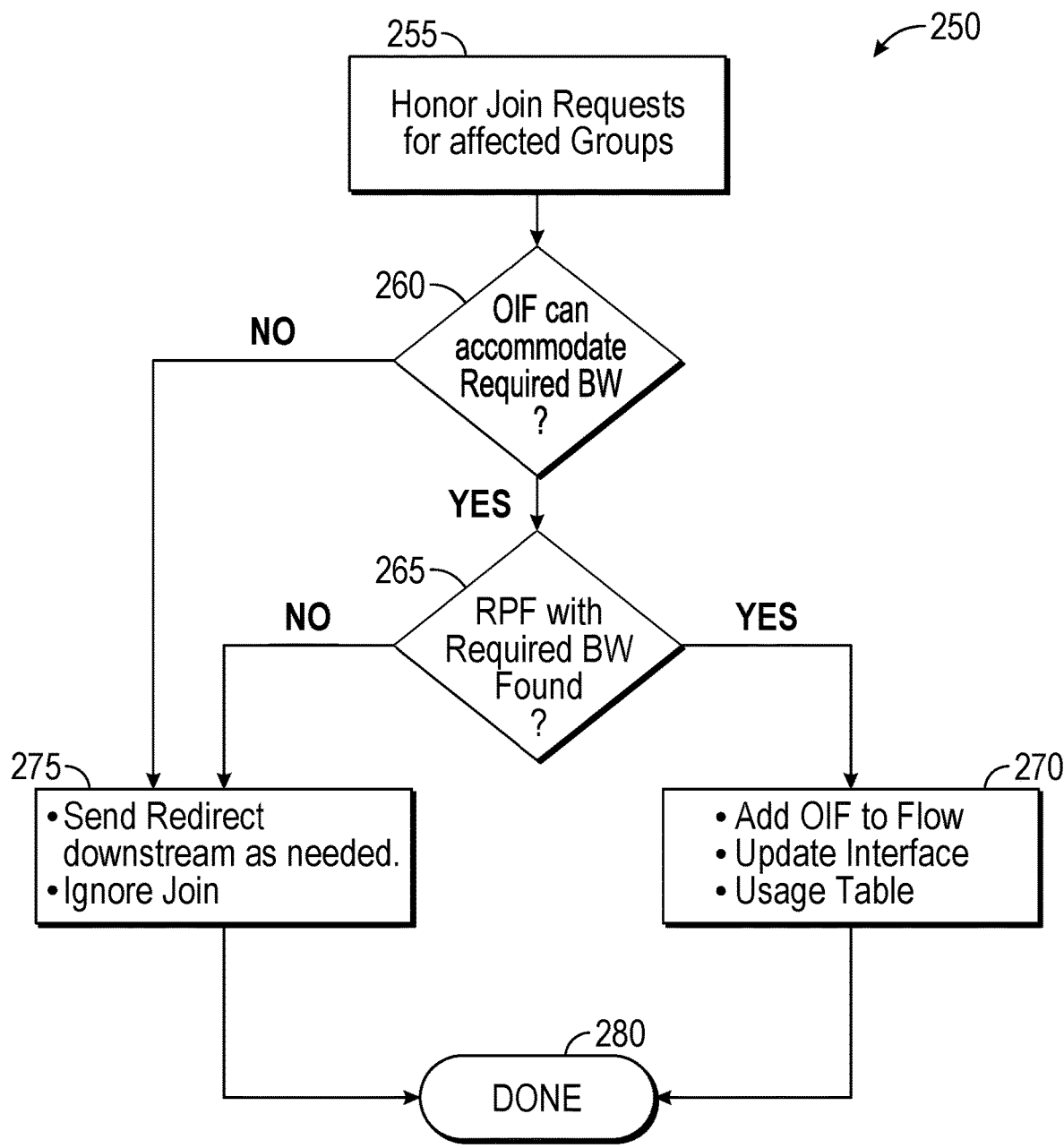

FIG. 2A and FIG. 2B are flow charts setting forth the general stages involved in a method 200 and a method 250 consistent with an embodiment of the disclosure for providing in service flow capability updating in a guaranteed bandwidth multicast network when the bandwidth requirement of a flow has changed from zero to a value greater than zero (i.e., X). Method 200 and method 250 may be implemented using any of the plurality of nodes as described in more detail above with respect to FIG. 1. Method 200 may be from the perspective of the RPF interface and method 250 may be from the perspective of the 01F. Ways to implement the stages of method 200 and method 250 will be described in greater detail below.

If the bandwidth requirement is not defined for a group at a given node in system 100, then the RPF interface of a flow may remain NULL. Accordingly, the flow may not be provisioned on the given node. However, updating flow policy table 120 with a non-zero bandwidth (i.e., X) may trigger RPF interface resolution (stage 205) and hence flow creation. At stage 210, the given node may determine if the given node has an RPF interface that can accommodate the flow. If the given node does not have an RPF interface that can accommodate the flow, method 200 may end at stage 215. However, if the given node does have an RPF interface that can accommodate the flow, method 200 may proceed to stage 220. At stage 220, the given node may update the RPF interface (i.e., the incoming interface of the flow) link bandwidth in the usage interface table to the latest value because the RPF interface can accommodate the latest bandwidth value (i.e., X) and update the policer at the RPF interface with the new bandwidth information because the RPF interface can accommodate the latest bandwidth value (i.e., X). From stage 220 method 200 may advance to stage 215 and end.

As illustrated in method 250, the given node in system 100 may update the flow OIF based on Internet Group Management Protocol (IGMP)/Protocol Independent Multicast (PIM) joins received at the given node from directly attached hosts (i.e., receivers) or other downstream nodes if sufficient bandwidth is available (stage 255). If the OIF (stage 260) and the RPF interface (stage 265) can accommodate the new required bandwidth (i.e., X), method 255 may advance to stage 270 where the given node may update each of the OIF's (i.e., outgoing interfaces of the flow) link bandwidths in the usage interface table to the latest value (i.e., X) if the OIFs can accommodate the latest bandwidth value and adds the OIFs to the flow. However, if the OIFs (stage 260) or if the RPF interface (stage 265) cannot accommodate the new required bandwidth (i.e., X), method 255 may advance to stage 275 where a redirect may be sent downstream in response to the aforementioned join and the join may be ignored. From stage 270 or from stage 275, method 250 may end at stage 280.

Figure 3:
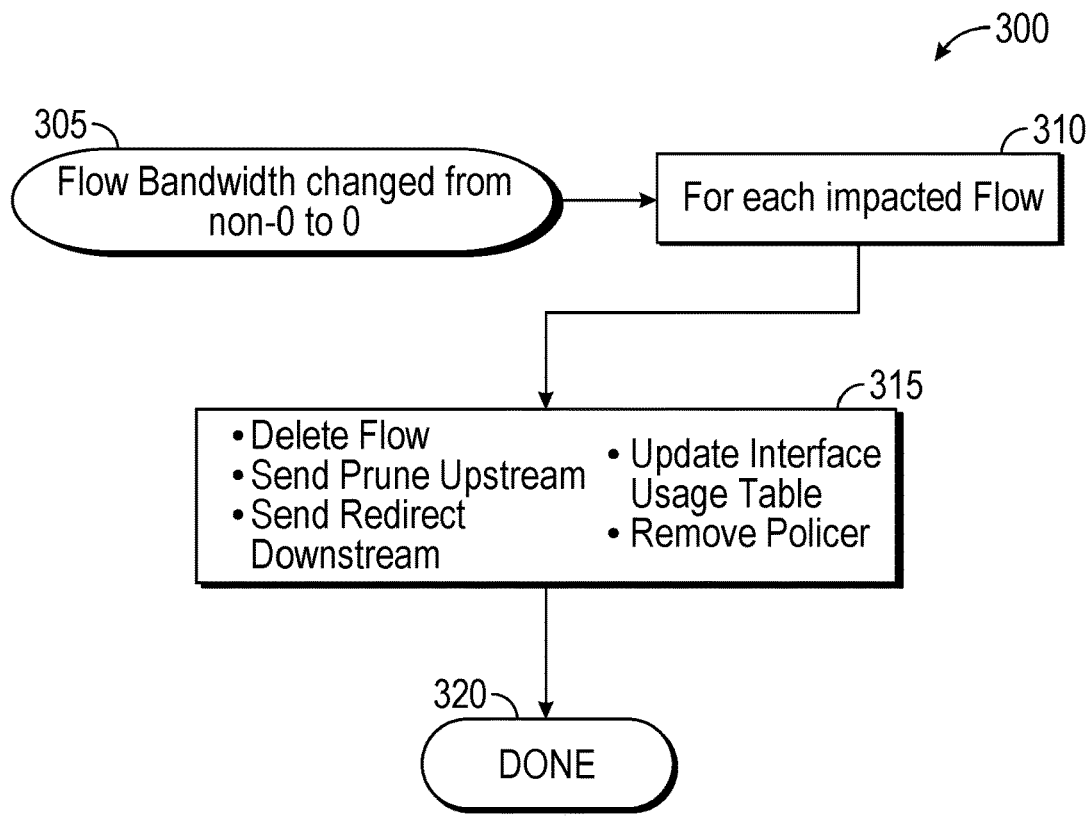
FIG. 3 is a flow chart setting forth the general stages involved in a method for providing in service flow capability updating in a guaranteed bandwidth multicast network when the bandwidth requirement of a flow has changed from a value greater than zero (i.e., X) to zero.

FIG. 3 is a flow chart setting forth the general stages involved in a method 300 consistent with an embodiment of the disclosure for providing in service flow capability updating in a guaranteed bandwidth multicast network when the bandwidth requirement of a flow has changed from a value greater than zero (i.e., X) to zero. Method 300 may be implemented using any of the plurality of nodes as described in more detail above with respect to FIG. 1. Ways to implement the stages of method 300 will be described in greater detail below.

If the bandwidth of an established flow is modified to 0 (stage 305) at a given node, this implies that, for each impacted flow (stage 310) the existing flow should be removed from system 100 (stage 315). At stage 315, the flow may be deleted and a prune and a redirect may be sent downstream. In addition, the usage interface table may be updated to reflect the surrendered bandwidth for the RPF interface and OIFs. The policer for the ended flow at the RPF interface may be removed. In other words, changing the bandwidth value to 0 may trigger flow deletion and resource bandwidth reclamation. From stage 315, method may advance to stage 320 and end.

Figure 4:
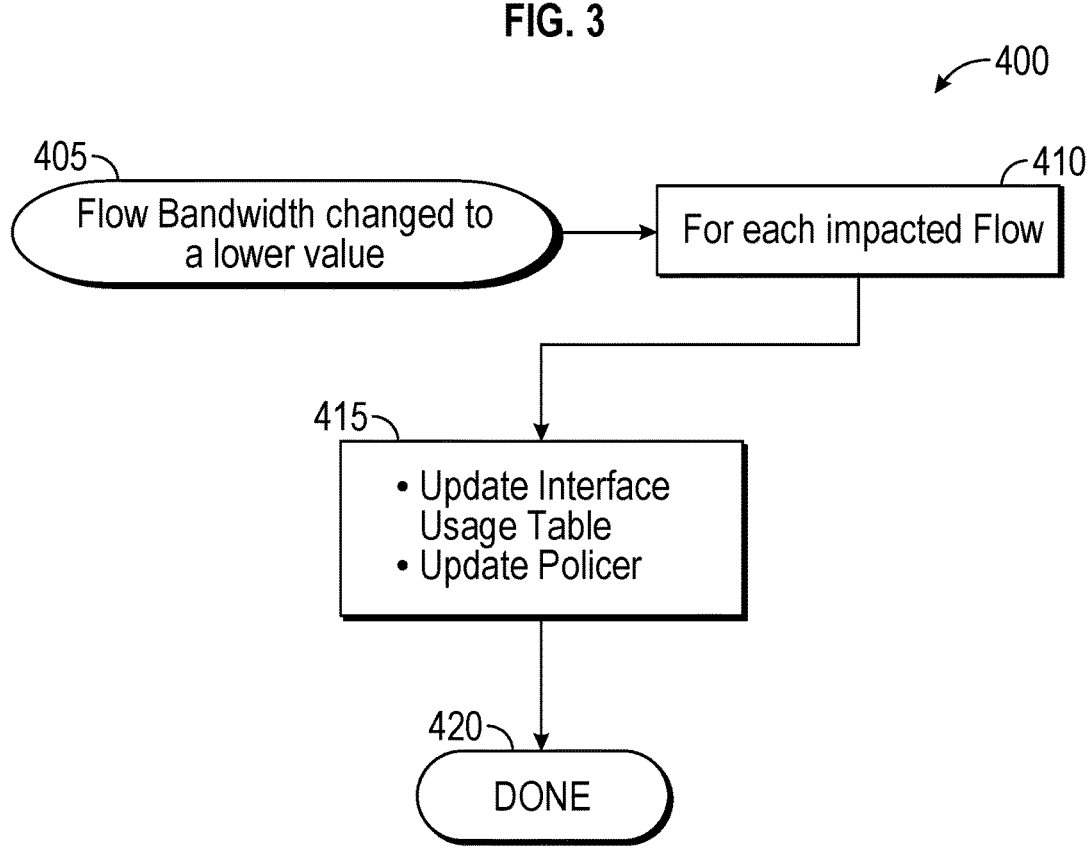
FIG. 4 is a flow chart setting forth the general stages involved in a method for providing in service flow capability updating in a guaranteed bandwidth multicast network when the bandwidth requirement of a flow has changed from a value (i.e., X) to a lesser value (i.e., Y)

FIG. 4 is a flow chart setting forth the general stages involved in a method 400 consistent with an embodiment of the disclosure for providing in service flow capability updating in a guaranteed bandwidth multicast network when the bandwidth requirement of a flow has changed from a value (i.e., X) to a lesser value (i.e., Y). Method 400 may be implemented using any of the plurality of nodes as described in more detail above with respect to FIG. 1. Ways to implement the stages of method 400 will be described in greater detail below.

If the bandwidth of an established flow is modified to a lower value (stage 405), the existing flows may be accommodated on the already used interfaces for each impacted flow (stage 410). Hence, the path of the flows may be left as is; however, system 100 may reclaim the surrendered bandwidth because of the policy change and may update the existing policers. The usage interface table may be updated to reflect the surrendered bandwidth for the RPF interface and OIFs. The policer for the RPF interface may also be updated with the new value (stage 415). From stage 415, method may advance to stage 420 and end.

Figure 5A:
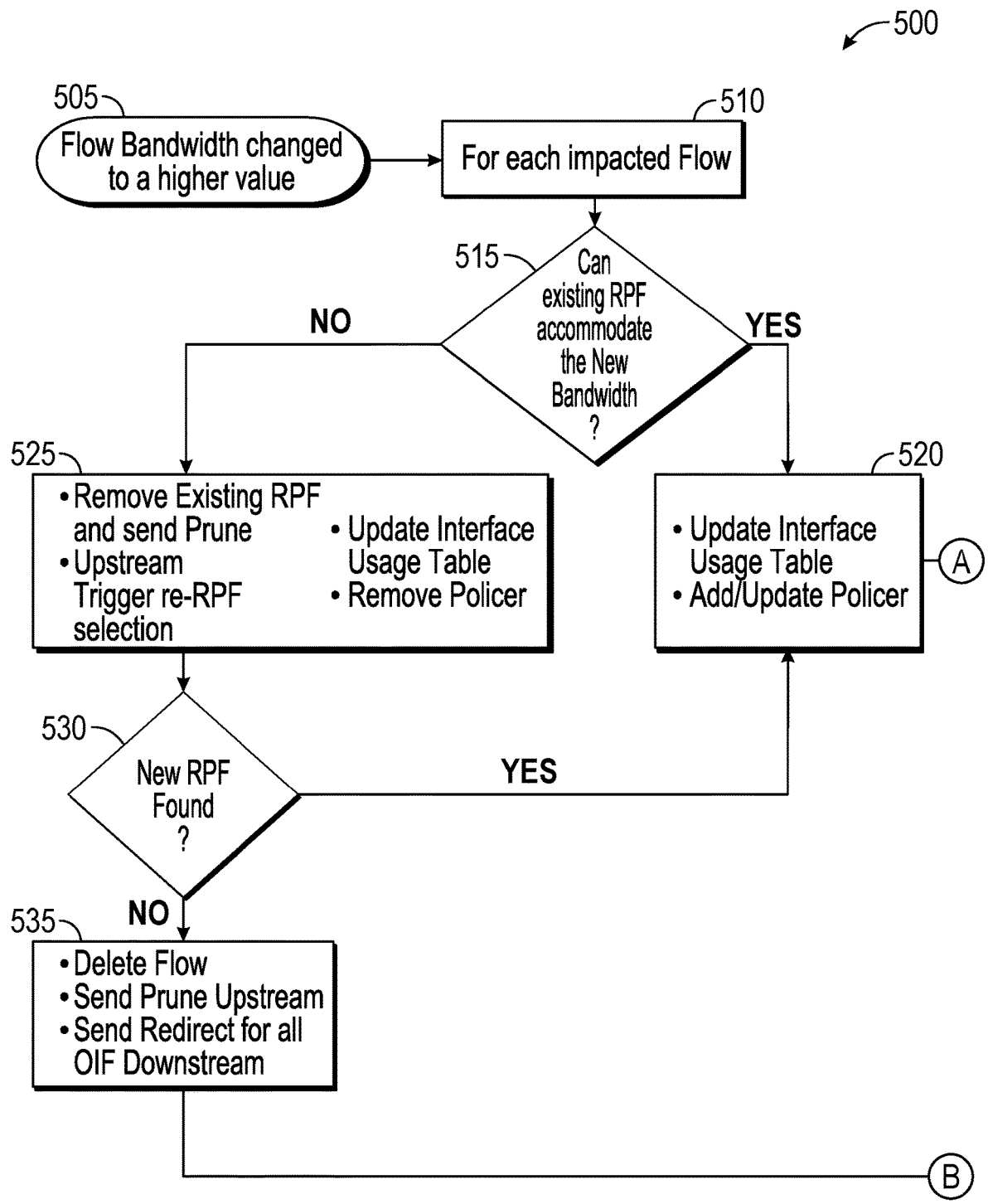
FIG. 5A and FIG. 5B are a flow chart setting forth the general stages involved in a method for providing in service flow capability updating in a guaranteed bandwidth multicast network when the bandwidth requirement of a flow has changed from a value (i.e., X) to a greater value (i.e., Y)
Figure 5B:
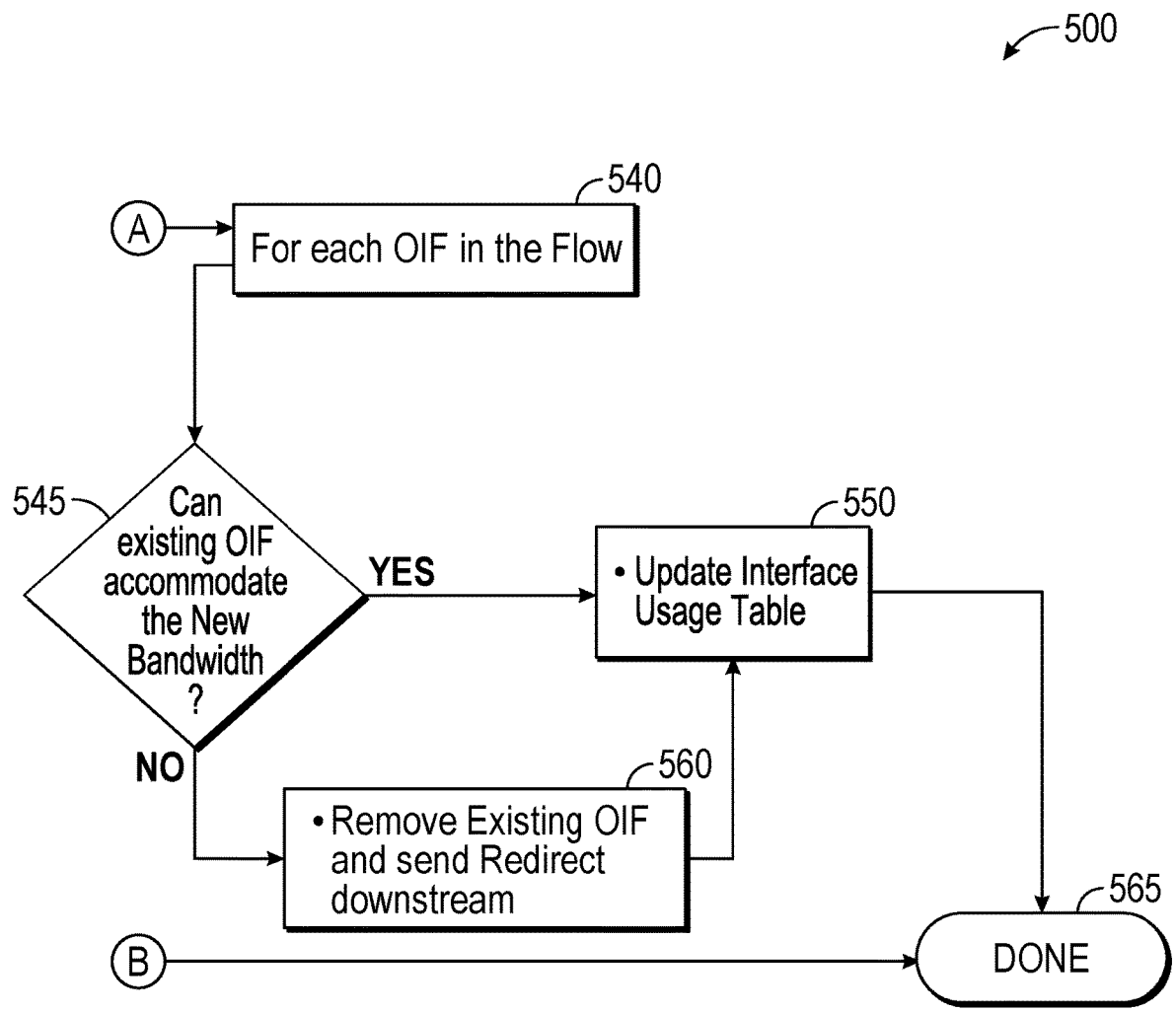

FIG. 5A and FIG. 5B are a flow chart setting forth the general stages involved in a method 500 consistent with an embodiment of the disclosure for providing in service flow capability updating in a guaranteed bandwidth multicast network when the bandwidth requirement of a flow has changed from a value (i.e., X) to a greater value (i.e., Y). Method 500 may be implemented using any of the plurality of nodes as described in more detail above with respect to FIG. 1. Ways to implement the stages of method 500 will be described in greater detail below.

When the bandwidth requirement of an established flow is modified to a new, higher value, embodiments of the disclosure may check to see if the existing RPF interface can still accommodate the new bandwidth requirement. If so, the policer and interface usage table may be updated. However, if the new bandwidth requirement cannot be accommodated on the already existing RPF interface for the flow, the established flow may be removed, and a prune may be sent upstream as needed. A node comprising an FHR for this flow may delete the flow. In response, any IFRs and LHRs that were receiving this flow may look for a new RPF interface, and if found, may send joins upstream. If, however, no valid RPF interfaces are available, a redirect may be sent downstream to PIM enabled devices, the flow may be deleted on the IFRs and LHRs, and the interface usage table may be updated. The downstream device may attempt to find a new path based on the new bandwidth requirement and re-stitch the flow if possible. For an OIF, if an outgoing interface cannot accept the new, higher bandwidth, the OIF may be deleted from the flow and if it was owned by PIM, a redirect may be sent downstream. If an OIF can accommodate the new bandwidth, however, it is left as is, and the interface usage table may be updated.

As shown in FIG. 5A and FIG. 5B, if the bandwidth requirement of an established flow is modified to a new, higher value (stage 505), every node in system 100 may receive the new bandwidth requirement, and look for any existing flows that may be impacted by the change. For each impacted flow (stage 510), each node may check to see if the existing RPF interface can still accommodate the new bandwidth requirement if it were increased to the new level (stage 515). If yes, the node may reserve the new additional bandwidth in the interface usage table for the RPF interface, update the policer for the RPF interface with the new bandwidth, and continue to use the existing RPF interface for the impacted flow (stage 520). If no, the node may remove the existing RPF interface, remove the policer for the RPF interface, send a prune upstream, reclaim the bandwidth for RPF interface by updating the interface usage table with the bandwidth freed as a result of removing the RPF interface accordingly, and try to find a new RPF interface for the flow that may accommodate the new bandwidth requirement (stage 525).

At stage 530, if a new RPF interface is not found, the node may delete the flow, send a device redirect (i.e., a NACK) downstream on OIFs created due to a PIM join (this may trigger migration on downstream devices for this flow). No special action may be taken for OIFs created via an IGMP join. The node may also set the RPF interface for the flow to NULL and reclaim the bandwidth for all the OIFs by updating the interface usage table with the bandwidth freed as a result of removing the OIFs (stage 535). However, if at stage 530, a new RPF interface is found that has sufficient bandwidth available to accommodate the new bandwidth requirement, the node may update the flow with the new interface as the RPF interface. In addition, a new policer may be established for the new RPF interface with the new bandwidth requirement and the interface usage table may be updated to reserve the new bandwidth requirement for the new RPF interface.

Next, for each OIF in the flow (stage 540) the node may check each OIF to see if remaining bandwidth on existing OIFs can be used to accommodate the new bandwidth requirement (stage 545). If remaining bandwidth on given existing OIFs can be used to accommodate the new bandwidth requirement, the node may update the interface usage table to reserve the new bandwidth requirement for the given OIFs (stage 550). However, if remaining bandwidth on given existing OIFs cannot be used to accommodate the new bandwidth requirement, the node may remove the given OIFs and reclaim the bandwidth for all the given OIFs by updating the interface usage table with the bandwidth freed as a result of removing the OIFs (stage 560). For an OIF created via a PIM join, a NACK may be sent to downstream devices (i.e., nodes) on the impacted OIF (this may trigger migration on downstream devices for this flow). For an OIF created via IGMP, no action may be taken. Method 500 may end at stage 565.

Consistent with embodiments of the disclosure, if the bandwidth requirement exceeds the bandwidth available on a selected link or an existing flow, the system may try to find alternate possible paths from a receiver to a sender while retaining as many flows intact as possible. If a certain part of the flow cannot be accommodated, it may be migrated to a next possible path in the system. If there is no path possible, the impacted part of flow may be torn down and then periodically (e.g., through IGMP/PIM joins) retried and re-provisioned as and when bandwidth becomes available in the system.

Figure 6:
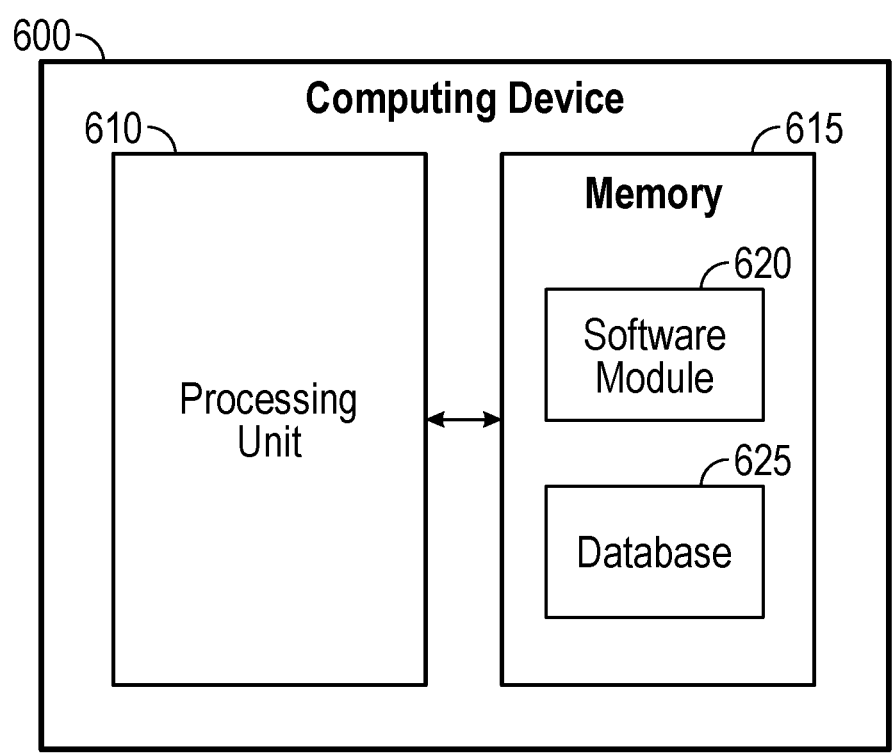
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing in service flow capability updating in a guaranteed bandwidth multicast network, including for example, any one or more of the stages from method 200, method 300, method 400, or method 500 described above with respect to FIG. 2, FIG. 3, FIG. 4, FIG. 5A, and FIG. 5B. Computing device 600, for example, may provide an operating environment for first leaf node 102, second leaf node 104, third leaf node 106, first spine node 108, second spine node 110, sender 112, first receiver 114, second receiver 116, third receiver 118, and a policer. First leaf node 102, second leaf node 104, third leaf node 106, first spine node 108, second spine node 110, sender 112, first receiver 114, second receiver 116, third receiver 118, and the policer may operate in other environments and is not limited to computing device 600.

Computing device 600 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

determining, by a node of a network, that a bandwidth requirement of a flow has changed to a new bandwidth value;

updating, in response to determining that the bandwidth requirement of the flow has changed to the new bandwidth value, an ingress capacity value in an interface usage table for a Reverse Path Forwarding (RPF) interface corresponding to the flow, the RPF interface being disposed on a network device, wherein the interface usage table is maintained at the network device, and wherein updating the ingress capacity value comprises:

determining that the RPF interface is able to accommodate the new bandwidth value, and updating the ingress capacity value in the interface usage table in response to determining that the RPF interface is able to accommodate the new bandwidth value;

updating, in response to determining that the bandwidth requirement of the flow has changed to the new bandwidth value, an egress capacity value in the interface usage table for an Outgoing Interface (OIF) corresponding to the flow, the OIF being disposed on the network device;

providing, by the node, the flow at the new bandwidth value; and further comprising updating a policer value in a policer with the new bandwidth value, the policer configured to limit the flow at the RPF interface to the policer value.

2. The method of claim 1, wherein determining that the bandwidth requirement of the flow has changed to the new bandwidth value comprises determining that the bandwidth requirement has decreased.

3. The method of claim 1, wherein determining that the bandwidth requirement of the flow has changed to the new bandwidth value comprises determining that the bandwidth requirement has increased.

4. The method of claim 3, further comprising: determining that the OIF is able to accommodate the new bandwidth value; and wherein updating the egress capacity value comprises updating the egress capacity value in response to determining that the OIF is able to accommodate the new bandwidth value.

5. The method of claim 1, further comprising updating a flow policy table with the new bandwidth value.

6. A system comprising:

a memory storage; and a processing unit coupled to the memory storage, wherein the processing unit is operative to:

determine that a bandwidth requirement of a flow has changed to a new bandwidth value;

update, in response to determining that the bandwidth requirement of the flow has changed to the new bandwidth value, an ingress capacity value in an interface usage table for a Reverse Path Forwarding (RPF) interface corresponding to the flow, the RPF interface being disposed on a network device, wherein the interface usage table is maintained at the network device, and wherein the processing unit being operative to update the ingress capacity value comprises the processing unit being operative to:

determine that the RPF interface is able to accommodate the new bandwidth value, and update the ingress capacity value in the interface usage table in response to determining that the RPF interface is able to accommodate the new bandwidth value;

update, in response to determining that the bandwidth requirement of the flow has changed to the new bandwidth value, an egress capacity value in the interface usage table for an Outgoing Interface (OIF) corresponding to the flow, the OIF being disposed on the network device;

provide the flow at the new bandwidth value; and wherein the processing unit is further operative to update a policer value in a policer with the new bandwidth value, the policer configured to limit the flow at the RPF interface to the policer value.

7. The system of claim 6, wherein the processing unit being operative to determine that the bandwidth requirement of the flow has changed to the new bandwidth value comprises the processing unit being operative to determine that the bandwidth requirement has decreased.

8. The system of claim 6, wherein the processing unit being operative to determine that the bandwidth requirement of the flow has changed to the new bandwidth value comprises the processing unit being operative to determine that the bandwidth requirement has increased.

9. The system of claim 8, wherein the processing unit is further operative to: determine that the OIF is able to accommodate the new bandwidth value; and wherein the processing unit being operative to update the egress capacity value comprises the processing unit being operative to update the egress capacity value in response to determining that the OIF is able to accommodate the new bandwidth value.

10. The system of claim 6, wherein the processing unit is further operative to update a flow policy table with the new bandwidth value.

11. The system of claim 6, wherein the policer is instantiated at each RPF interface.

12. A computer-readable medium that stores a set of instructions, the set of instructions when executed by a processor perform a method comprising:

determining, by a node, that a bandwidth requirement of a flow has changed to a new bandwidth value;

updating, in response to determining that the bandwidth requirement of the flow has changed to the new bandwidth value, an ingress capacity value in an interface usage table for a Reverse Path Forwarding (RPF) interface corresponding to the flow, the RPF interface being disposed on a network device, wherein the interface usage table is maintained at the network device, and wherein updating the ingress capacity value comprises:

determining that the RPF interface is able to accommodate the new bandwidth value, and updating the ingress capacity value in the interface usage table in response to determining that the RPF interface is able to accommodate the new bandwidth value;

updating, in response to determining that the bandwidth requirement of the flow has changed to the new bandwidth value, an egress capacity value in the interface usage table for an Outgoing Interface (OIF) corresponding to the flow, the OIF being disposed on the network device; and further comprising updating a policer value in a policer with the new bandwidth value, the policer configured to limit the flow at the RPF interface to the policer value.

13. The computer-readable medium of claim 12, wherein determining that the bandwidth requirement of the flow has changed to the new bandwidth value comprises determining that the bandwidth requirement has decreased.

14. The computer-readable medium of claim 12, wherein determining that the bandwidth requirement of the flow has changed to the new bandwidth value comprises determining that the bandwidth requirement has increased.

15. The computer-readable medium of claim 14, further comprising: determining that the OIF is able to accommodate the new bandwidth value; and wherein updating the egress capacity value comprises updating the egress capacity value in response to determining that the OIF is able to accommodate the new bandwidth value.

16. The computer-readable medium of claim 12, further comprising updating a flow policy table with the new bandwidth value.

17. The computer-readable medium of claim 12, wherein the policer is instantiated at each RPF interface.

* * * * *